Dec. 11, 1956   H. R. STOCKS ET AL   2,773,399
STEERING COLUMN TRANSMISSION CONTROL MECHANISM
Filed Feb. 2, 1955   3 Sheets-Sheet 1

INVENTORS
Harry R. Stocks,
BY Thomas C. F. Stott &
Frank Westcott
Attorney

Dec. 11, 1956    H. R. STOCKS ET AL    2,773,399
STEERING COLUMN TRANSMISSION CONTROL MECHANISM
Filed Feb. 2, 1955    3 Sheets-Sheet 2

INVENTORS
Harry R. Stocks,
BY Thomas C. F. Stott &
Frank Westcott
Attorney

Dec. 11, 1956   H. R. STOCKS ET AL   2,773,399
STEERING COLUMN TRANSMISSION CONTROL MECHANISM
Filed Feb. 2, 1955   3 Sheets-Sheet 3
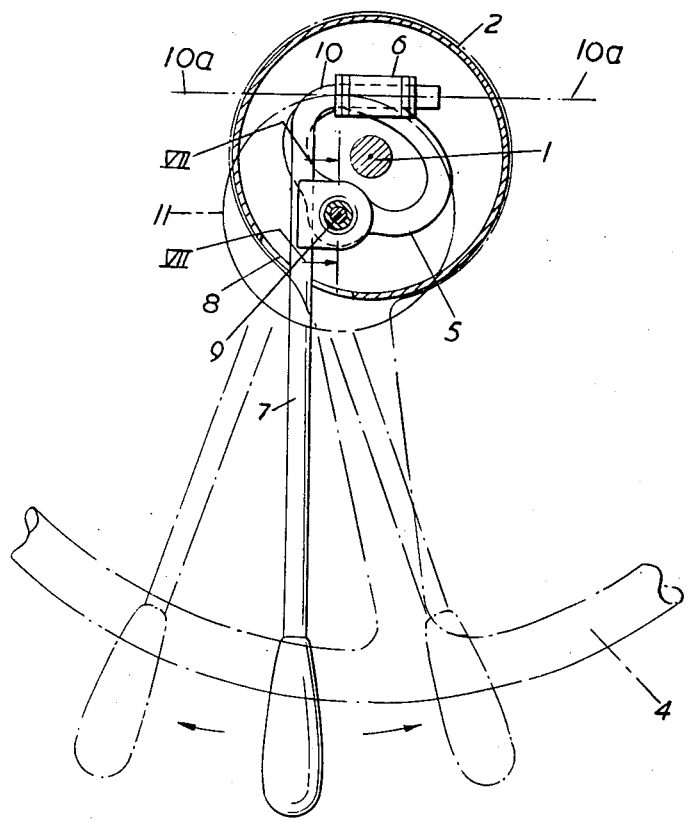
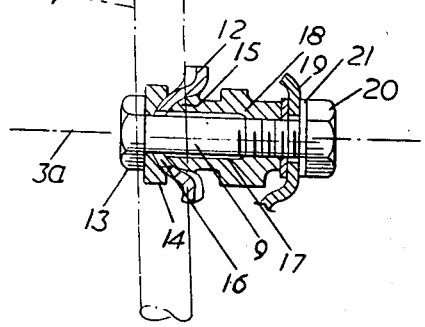
INVENTORS
Harry R. Stocks,
BY Thomas C. F. Stott &
Frank Westcott
Attorney

# United States Patent Office 2,773,399
Patented Dec. 11, 1956

2,773,399

STEERING COLUMN TRANSMISSION CONTROL MECHANISM

Harry R. Stocks, Greenways, Whipsnade, Dunstable, and Thomas C. F. Stott and Frank Westcott, Harpenden, England, assignors to General Motors Corporation, Detroit, Mich., a corporation of Delaware Application February 2, 1955, Serial No. 485,646

Claims priority, application Great Britain February 24, 1954

24 Claims. (Cl. 74—484)

This invention relates to steering column transmission control mechanisms for motor vehicles.

The principal object of the present invention is to provide a steering column transmission control mechanism for a motor vehicle, comprising a transmission control rod reciprocably and rotatably mounted alongside the steering shaft, and a hand lever, which is universally mounted intermediate its ends on a fixed part of the mechanism about a pivot point on the axis of the rod, and is pivotally connected at one end to the rod, the pivotal axis of its connection being in a plane perpendicular to the axis of the rod and tangential to a circle about the pivot point.

Preferably the pivotal axis of the connection is on the other side of the steering shaft to the axis of the transmission control rod. In this case the steering shaft and transmission control rod may be enclosed within a stationary column.

The pivotal connection of the hand lever to the rod is preferably made by means of a ring secured at the upper end of the transmission control rod and surrounding the steering shaft.

The transmission control rod may have a transverse pin at the lower end engageable alternately in longitudinal slots in two sleeves mounted for rotation, prevented from axial movement and each connected to a gear-shift shaft on a transmission.

In order to enable the length of the gear-shift rod to be adjusted to meet manufacturing tolerances, the lower end of the rod preferably enters a socket mounted for rotation and reciprocation and is clamped within this socket. In order to radially locate the rod and socket, a longitudinal pip may be upset from the rod to engage a longitudinal slot in the socket.

Preferably, a spring urges the transmission control rod and hand lever into a selection position for a gear ratio group, such as the second and third ratios.

The scope of the invention is defined by the appended claims; and how it can be carried into effect is hereinafter particularly described with reference to the accompanying drawings, in which:

Figure 6 is a section on the line VI—VI of Figure 5; and

Figure 7 is a section on the line VII—VII of Figure 6.

The steering shaft is rotatably supported within a stationary column 2 secured to the dash.

Figure 5:
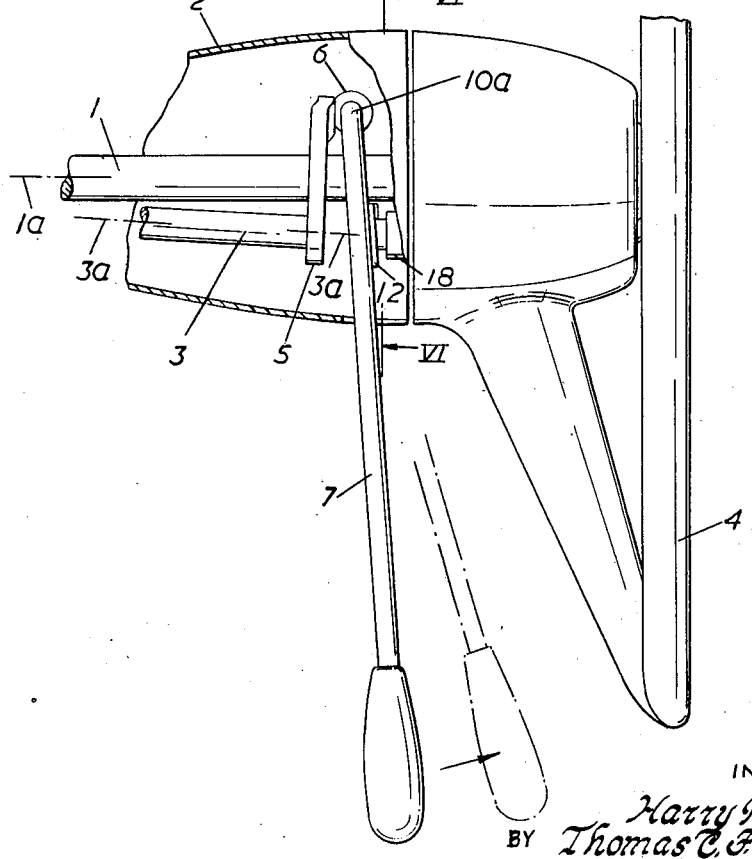
Figure 5 is an enlarged plan, partly broken away, of part of the mechanism in the direction of the arrow V in Figure 1.

Within the column 2 and arranged alongside the steering shaft 1, with its axis 3a (Figs. 2 and 5) at an angle to the axis 1a of the steering shaft, is a transmission control rod 3 whose upper end is disposed a short distance below a steering wheel 4 at the upper end of the steering shaft 1.

A ring 5 (Figs. 5 and 6) is secured to the upper end of the transmission control rod 3 and surrounds the steering column shaft 1. On the side of the steering shaft 1 opposite to the axis 3a of the transmission control rod 3, the ring 5 has a pivot bearing 6 for a hand lever 7 which projects through a hole 8 in the column 2 and is universally mounted intermediate its ends about a pivot point 9 on the axis 3a of the transmission control rod 3 and close to the column 2.

The hand lever 7 has a portion 10 bent at right angles to the rest of the lever, and this portion 10 is journaled in the pivot bearing 6. Thus the pivotal connection between the hand lever 7 and the transmission control rod 3 has its axis 10a (Fig. 6) in a plane perpendicular to the axis 3a of the rod 3 and tangential to a circle 11 about the pivot point 9.

The universal mounting of the hand lever 7 (Fig. 7) comprises a cup member 12 secured to the hand lever 7 and held by a bolt 13 and washer 14 in contact with a stationary ball member 15 whose centre is the pivot point 9 and lies on the axis 3a of the transmission control rod 3. The cup member 12 and ball member 15 have central holes 16 and 17 respectively through which the bolt 13 passes. The ball member 15 forms part of a boss 18 secured to a fixed part 19 of the steering mechanism extending inwardly from the column 2 by a nut 22 and washer 23 screwed onto the end of the bolt 13.

The hole 8 in the column 2 (Fig. 1) is in the form of a rectangular slot and permits the hand lever 7 to swing in a plane through the hand lever and at right angles to the axis 10a and in planes transverse thereto through the hand lever 7 and the axis 10a.

Figure 4:
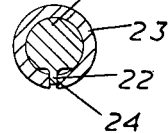
Figure 4 is a section on the line IV—IV of Figure 2.

At the lower end of the transmission control rod 3 (Figs. 2 and 4) a longitudinal pip 22 is upset from the material of the rod 3 and the rod is inserted into a socket 23 with a longitudinal slot 24 to receive the pip 22. The rod 3 is then clamped to the socket 23 by a clamp 25, the connection being such as to allow adjustment to meet manufacturing tolerances. A tension spring 26 secured between the bolt 27 of the clamp 25 and a hole 28 in the column 2 biases the transmission control rod 3 upwards.

Figure 1:
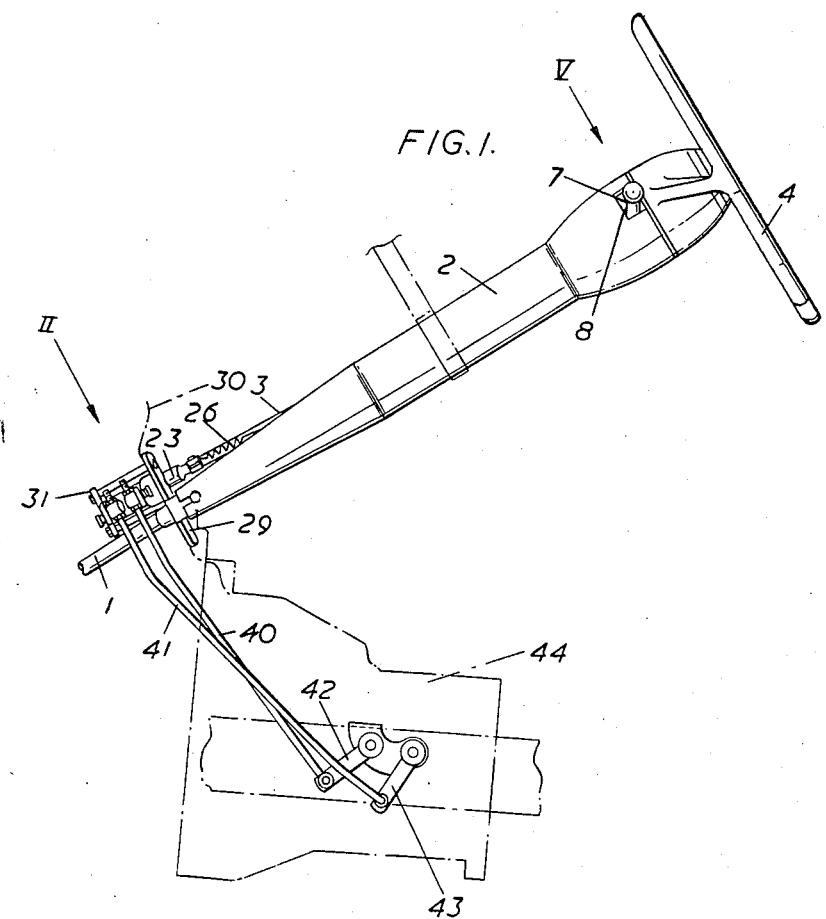
Figure 1 is a side elevation of a motor vehicle steering column having transmission control mechanism according to the present invention.
Figure 2:
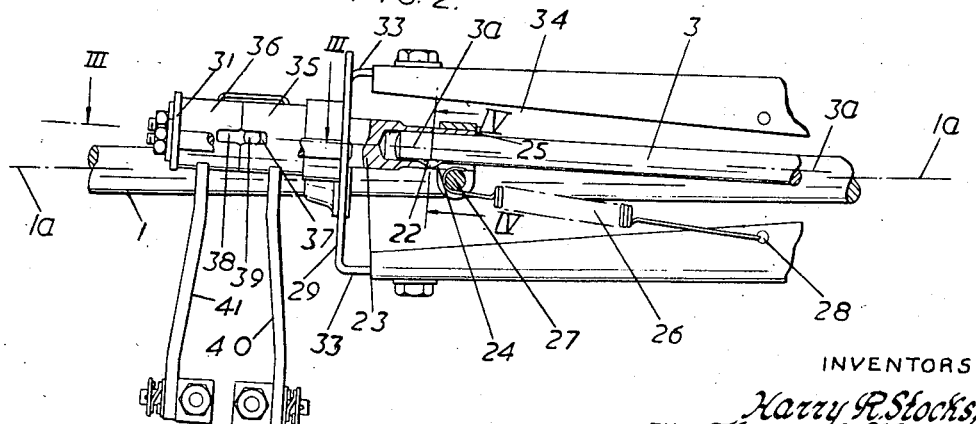
Figure 2 is a plan of part of the mechanism in the direction of the arrow II in Figure 1.
Figure 3:
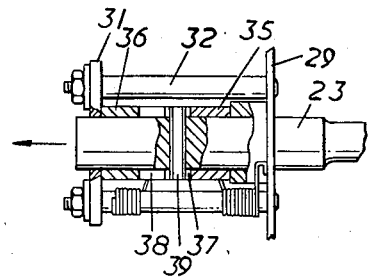
Figure 3 is a section on the line III—III of Figure 2.

The socket 23 is mounted rotatably and reciprocably in a plate 29 secured to the foot-board 30 of the vehicle and in a second plate 31 supported and spaced from the plate 29 by spacer bolts 32 (Fig. 3). The column 2 is bolted to fingers 33 formed on the plate 29 and has a triangular slot 34 through which the transmission control rod extends (Fig. 2). The socket 23, between the plates 29 and 31, supports two sleeves 35 and 36 which are rotatable but nonreciprocable. The sleeves 35 and 36 have longitudinal slots 37 and 38 respectively and a transverse pin 39 in the socket 23 is engageable alternately in the slots 37 in one sleeve 35 or in the slots 38 in the other sleeve 36. The sleeves 35 and 36 are connected by linkage 40, 41 to striking fork levers 42, 43 respectively on the side of the transmission 44 (Figs. 1 and 2).

The striking fork lever 42 is that for second and third ratios and the lever 43 is that for first and reverse ratios, so that the mechanism is normally biased to second and third ratio position.

In operation, the hand lever 7 is swung in the plane through the hand lever and at right angles to the axis 10a to pivot about the pivot point 9 and the pivotal bearing axis 10a, and to reciprocate the transmission control rod 3 and socket 23 to shift the pin 39 from the slot 37 in one sleeve 35 to the slot 38 in the other sleeve 36 against the bias of the spring 26. The transmission control rod is thus moved from a selection position for choosing a ratio from the gear ratio group comprising second and third ratios, to the selection position for first and reverse ratios.

When the desired group of first and reverse ratios has been chosen by reciprocation of the transmission control rod 3, the hand lever 7 is swung about the pivot point 9 in the plane through the hand lever and the axis 10a. This produces rotation of the transmission control rod 3 and socket 23, and the sleeve 36, whose slot 38 is engaged by the transverse pin 39 in the socket 23, is rotated in one direction or the other, effecting rocking of the appropriate striking fork lever 43 in one direction or the other through the connecting linkage 41 to select the ratio, first or reverse.

If second or third ratio is to be chosen, the hand lever 7 is again swung about the pivot point 9 in the plane through the hand lever and the axis 10a until the striking fork lever 43 is in the neutral position, when the lever 7 is released and the spring 26 moves the transmission control rod 3 upwardly to the selection position for second and third ratios. The procedure is then the same for the selection of ratio as for the selection of first or reverse.

The construction described enables a stationary column to be provided surrounding the steering shaft and transmission control rod without the pivot of the hand lever and rod projecting through the cover so that the column can be of minimum dimensions. As the pivot point of the universal mounting is close to the column the hole in the latter need only be a small one.

I claim:

1. A steering column transmission control mechanism for a motor vehicle comprising a steering shaft, a fixed support for said steering shaft, a transmission control rod reciprocably and rotatably mounted on an axis alongside said steering shaft and having an upper and a lower end, a ring secured to said upper end of said transmission control rod and surrounding said steering shaft, a hand lever, a universal mounting intermediate the ends of said lever on said fixed support about a pivot point on said axis of said rod, and a pivotal connection between one end of said lever and said ring, the pivotal axis of said connection being in a plane perpendicular to said axis of said rod and tangential to a circle about said pivot point.

2. Mechanism according to claim 1, comprising a spring operatively connected between said rod and said support for urging the said rod and said lever into a selection position for a gear ratio group.

3. A steering column transmission control mechanism for a motor vehicle comprising a steering shaft, a fixed support for said steering shaft, a transmission control rod reciprocably and rotatably mounted on an axis alongside said steering shaft, a ring secured to the upper end of said transmission control rod and surrounding said steering shaft, a hand lever, a universal mounting intermediate the ends of said lever on said fixed support about a pivot point on said axis of said rod, and a pivotal connection between one end of said lever and said ring, the pivotal axis of said connection being in a plane perpendicular to said axis of said rod, tangential to a circle about said pivot point and on the other side of said steering shaft to said axis of said rod.

4. Mechanism according to claim 3, comprising a spring operatively connected between said rod and said support for urging said rod and said lever into a selection position for a gear ratio group.

5. A steering column transmission control mechanism for a motor vehicle comprising a steering shaft, a fixed support, said steering shaft, a transmission control rod reciprocably and rotatably mounted on an axis alongside said steering shaft, a ring secured to the upper end of said transmission control rod and surrounding said steering shaft, a hand lever, a universal mounting intermediate the ends of said lever on said fixed support about a pivot point on said axis of said rod, a pivotal connection between one end of said lever and said ring, the pivotal axis of said connection being in a plane perpendicular to said axis of said rod and tangential to a circle about said pivot point, a pair of rotatable sleeves having longitudinal slots and connectible to gear-shift shafts on a transmission and a transverse pin at the lower end of said rod engageable alternately in one of said longitudinal slots to clutch one of said sleeves to said rod.

6. Mechanism according to claim 5, comprising a spring operatively connected between said rod and said support for urging said rod, said lever and said pin into a selection position for a gear ratio group.

7. A steering column transmission control mechanism for a motor vehicle comprising a steering shaft, a fixed support for said steering shaft, a transmission control rod reciprocably and rotatably mounted on an axis alongside said steering shaft and having upper and lower ends, a ring secured to said upper end of said rod and surrounding said steering shaft, a hand lever, a universal mounting intermediate the ends of said lever on said fixed support about a pivot point on said axis of said rod, a pivotal connection between one end of said lever and said ring, the pivotal axis of said connection being in a plane perpendicular to said axis of said rod and tangential to a circle about said pivot point, a socket into which said lower end of said rod is adjustably clamped and which is rotatable and reciprocable, a pair of rotatable and non-reciprocable sleeves having longitudinal slots on said socket and each connectible to a gear-shift shaft on a transmission, and a transverse pin at the lower end of said socket engageable alternately in one of said longitudinal slots to clutch one of said sleeves to said socket.

8. Mechanism according to claim 7, wherein the said socket has a longitudinal slot and wherein a longitudinal pip is upset from said rod for adjustable engagement in said longitudinal slot.

9. Mechanism according to claim 8, comprising a spring operatively connected between said rod and said support for urging said rod, said lever, said socket and said pin into a selection position for a gear ratio group.

10. A steering column gear shift mechanism for a motor vehicle comprising a stationary steering shaft cover, a steering shaft enclosed within said cover, a stationary support for said steering shaft, a gear shift rod reciprocably and rotatably mounted on an axis alongside the steering shaft, and a hand lever which is universally mounted intermediate its ends on said support about a pivot point on said axis of said rod and is pivotally connected at one end to said rod about a pivotal axis in a plane perpendicular to said axis of said rod and tangential to a circle about said pivot point.

11. A steering column gear shift mechanism for a motor vehicle comprising a stationary steering shaft cover, a steering shaft enclosed within said cover, a stationary support for said steering shaft, a gear shift rod reciprocably and rotatably mounted on an axis alongside the steering shaft, and a hand lever which is universally mounted intermediate its ends on said support about a pivot point on said axis of said rod and is pivotally connected at one end to said rod about a pivotal axis which is in a plane perpendicular to said axis of said rod, tangential to a circle about said pivot point and on the other side of said steering shaft to said axis of said rod.

12. A steering column gear shift mechanism for a motor vehicle comprising a stationary steering shaft cover, a steering shaft enclosed within said cover, a stationary support for said steering shaft, a gear shift rod reciprocably and rotatably mounted on an axis alongside the steering shaft, a ring secured to the upper end of said rod and surrounding said shaft, and a hand lever which is universally mounted intermediate its ends on said support about a pivot point on said axis of said rod and is pivotally connected at one end to said ring about a pivotal axis in a plane perpendicular to said axis of said rod and tangential to a circle about said pivot point.

13. A steering column gear shift mechanism for a motor vehicle comprising a stationary steering shaft cover, a steering shaft enclosed within said cover, a stationary support for said steering shaft, a gear shift rod reciprocably and rotatably mounted on an axis alongside the steering shaft, a ring secured to the upper end of said rod and surrounding said shaft, and a hand lever which is universally mounted intermediate its ends on said support about a pivot point on said axis of said rod and is pivotally connected at one end to said ring about a pivotal axis which is in a plane perpendicular to said axis of said rod, tangential to a circle about said pivot point and on the other side of said shaft to said axis of said rod.

14. A steering column gear shift mechanism for a motor vehicle comprising a steering shaft, a fixed cover closely surrounding said steering shaft and having internal support, a gear shift rod reciprocably and rotatably mounted on an axis alongside said steering shaft within said cover, a ring secured to the upper end of said gear shift rod and surrounding said steering shaft within said cover, and a hand lever which is universally mounted intermediate its ends on said support about a pivot point within said cover on said axis of said rod, and is pivotally connected within said cover at one end to said ring about a pivotal axis in a plane perpendicular to said axis of said rod and tangential to a circle about said pivot point.

15. A steering column gear shift mechanism for a motor vehicle comprising a steering shaft, a fixed cover close surrounding said steering shaft and having an internal support, a gear shift rod reciprocably and rotatably mounted on an axis alongside said steering shaft within said cover, a ring secured to the upper end of said gear shift rod and surrounding said steering shaft within said cover and a hand lever which is universally mounted intermediate its ends on said support about a pivot point within said cover on said axis of said rod, and is pivotally connected within said cover at one end to said ring about a pivotal axis which is in a plane perpendicular to said axis of said rod, tangential to a circle about the pivot point and on the other side of said shaft to said axis of said rod.

16. A steering column gear shift mechanism for a motor vehicle comprising a rotatable steering shaft, a stationary support therefor, a gear shift rod reciprocably and rotatably mounted with its axis alongside said steering shaft, and a hand lever which is universally mounted intermediate its ends on said stationary support about a pivot point on said axis of said gear shift rod and is pivotally connected at one end to said rod about a pivotal axis in a plane perpendicular to said axis of said rod and tangential to a circle about said pivot point.

17. A steering column gear shift mechanism for a motor vehicle comprising a rotatable steering shaft, a stationary support therefor, a gear shift rod reciprocably and rotatably mounted with its axis alongside the steering shaft, and a hand lever which is universally mounted intermediate its ends on said stationary support about a pivot point on said axis of said gear shift rod and is pivotally connected at one end to said rod about a pivotal axis in a plane perpendicular to said axis of said rod, and tangential to a circle about said pivot point and on the other side of said shaft to said axis of said rod.

18. A steering column gear shift mechanism for a motor vehicle comprising a rotatable steering shaft, a stationary support therefor, a gear shift rod reciprocably and rotatably mounted with its axis at an angle to and alongside the steering shaft, and a hand lever which is universally mounted intermediate its ends on said stationary support about a pivot point on said axis of said rod and is pivotally connected at one end to said rod about a pivotal axis in a plane perpendicular to said axis of said rod and tangential to a circle about said pivot point.

19. A steering column gear shift mechanism for a motor vehicle comprising a rotatable steering shaft, a stationary support therefor, a gear shift rod reciprocably and rotatably mounted with its axis at an angle to and alongside the steering shaft, and a hand lever which is universally mounted intermediate its ends on said stationary support about a pivot point on said axis of said rod and is pivotally connected at one end to said rod about a pivotal axis in a plane perpendicular to said axis of said rod, tangential to a circle about said pivot point and on the other side of said shaft to said axis of said rod.

20. In a transmission control mechanism, a control shaft, a fixed support for said control shaft, a transmission control rod reciprocably and rotatably mounted on an axis alongside said control shaft and having a control and a controlled end, a member secured to said control end of said transmission control rod and extending to the opposite side of said control shaft, a hand lever, a universal mounting intermediate the ends of said lever on said fixed support about a pivot point on said axis of said control shaft and a pivotal connection between one end of said lever and said member.

21. In a transmission control mechanism, a fixed support, a transmission control rod reciprocably and rotatably mounted on said support and having a control and a controlled end, a member secured to said control end of said transmission control rod and extending transversely from said control rod, a hand lever, a universal mounting intermediate the ends of said lever on said fixed support about a pivot point on said axis of said rod, and a pivotal connection between one end of said lever and said member, the pivotal axis of said connection being in a plane perpendicular to said axis of said rod and tangential to a circle about said pivot point.

22. In a transmission control mechanism, a stationary control shaft cover, a control shaft enclosed within said cover, a stationary support for said control shaft, a control rod reciprocably and rotatably mounted on an axis alongside the control shaft, and a hand lever which is universally mounted intermediate its ends on said support about a pivot point on said axis of said rod and is pivotally connected at one end to said rod about a pivotal axis in a plane perpendicular to said axis of said rod and tangential to a circle about said pivot point.

23. In a transmission control mechanism, a stationary control shaft cover, a control shaft enclosed within said cover, a stationary support for said control shaft, a control rod reciprocably and rotatably mounted on an axis alongside the control shaft, and a hand lever which is universally mounted intermediate its ends on said support about a pivot point on said axis of said rod and is pivotally connected at one end to said rod.

24. In a transmission control mechanism, a stationary support, a transmission control rod reciprocably and rotatably mounted on said stationary support, and a hand lever which is universally mounted intermediate its ends on said support about a pivot point on said axis of said rod and is pivotally connected at one end to said rod.

References Cited in the file of this patent

UNITED STATES PATENTS

| | | |
|---|---|---|
| 2,171,953 | Seaholm | Sept. 5, 1939 |
| 2,193,230 | Ferguson | Mar. 12, 1940 |
| 2,696,127 | Lincoln | Dec. 7, 1954 |